United States Patent
Tsai et al.

(10) Patent No.: US 7,409,124 B2
(45) Date of Patent: Aug. 5, 2008

(54) FIBER WAVEGUIDE OPTICAL SUBASSEMBLY MODULE

(75) Inventors: Ming-Lang Tsai, Hsinchu (TW); Ming Jie Chou, Hsinchu (TW); Bor-Chen Tsai, Hsinchu (TW); Zong-Yuan Wu, Hsinchu (TW); Chih-Hsiang Ko, Hsinchu (TW); Chin-Sheng Chang, Hsinchu (TW); Yii-Tay Chiou, Hsinchu (TW); Chun-Hsun Chu, Hsinchu (TW); Jung-Tai Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/105,514

(22) Filed: Apr. 14, 2005

(65) Prior Publication Data

US 2006/0110106 A1    May 25, 2006

(30) Foreign Application Priority Data

Nov. 25, 2004    (TW) .............................. 93136323 A

(51) Int. Cl.
*G02B 6/30* (2006.01)
*G02B 6/36* (2006.01)

(52) U.S. Cl. .......................................... 385/49; 385/89

(58) Field of Classification Search .................... 385/33, 385/35, 49, 50, 88–94, 36
See application file for complete search history.

(56) References Cited

U.S. PATENT DOCUMENTS

| 4,767,171 | A  | * | 8/1988  | Keil et al. ...................... 385/35 |
| 5,123,067 | A  | * | 6/1992  | Avelange et al. ............... 385/14 |
| 5,841,562 | A  |   | 11/1998 | Rangwala et al. |
| 5,867,622 | A  | * | 2/1999  | Miyasaka et al. .............. 385/88 |
| 6,374,021 | B1 | * | 4/2002  | Nakanishi et al. ............. 385/49 |
| 6,406,196 | B1 | * | 6/2002  | Uno et al. ....................... 385/89 |
| 6,571,033 | B2 | * | 5/2003  | Caracci et al. ................ 385/24 |
| 7,013,056 | B2 | * | 3/2006  | Lin et al. ........................ 385/14 |
| 7,027,677 | B2 | * | 4/2006  | Li et al. ......................... 385/14 |
| 2004/0208601 | A1 |   | 10/2004 | Tan et al. ...................... 398/135 |
| 2005/0249504 | A1 | * | 11/2005 | O'Donnell et al. .......... 398/140 |

FOREIGN PATENT DOCUMENTS

CN    1203374    12/1998
CN    1549465    11/2004

OTHER PUBLICATIONS

Hashimoto et al., *A Bidirectional Single Fiber 1.25GB/S Optical Transceiver Module With SFP Package Using PLC*, 2003, Electronic Components And Technology Conference, pp. 279-283.

* cited by examiner

*Primary Examiner*—Quyen P Leung
(74) *Attorney, Agent, or Firm*—Rabin & Berdo, P.C.

(57) ABSTRACT

A fiber waveguide optical subassembly uses the multi-mode fiber to increase the alignment tolerance between the active optical element and the waveguide. The filter is thinner to lower the dispersion due to the optical coupling gap. The subassembly further combines the optical bench to achieve passive positioning. Therefore it reduces the cost and enhances the transmission rate.

29 Claims, 6 Drawing Sheets

FIBER WAVEGUIDE OPTICAL SUBASSEMBLY MODULE

FIELD OF THE INVENTION

The invention generally relates to an optical subassembly applicable to passive optical network (PON) and fiber-to-the-home (FTTH) systems, and in particular relates to a fiber waveguide optical subassembly.

BACKGROUND OF THE INVENTION

The bi-directional optical transceiver commonly used in passive optical network (PON) and fiber-to-the-home (FTTH) systems are mainly of two types, duplexer and triplexer. The duplexer processes both data and voice signals, while the triplexer processes data, voice and video signals. As the increasing demands of digital and analog video transmission, conventional duplexer cannot meet the market requirements, and triplexer becomes the trend of optical communication in the future.

A duplexer optical subassembly mainly includes a light emitter and a light receiver. The light emitter is mainly a laser diode; the light receiver is mainly a photo diode. Whatever an emitter or a receiver, the optical path requires alignment. In the emitter side, there are alignment problems between the laser diode and the single-mode fiber or planar waveguide. Because the alignment tolerance of a single-mode fiber or planar waveguide is just 1 or 2 microns, it is easy to be misaligned and poor coupling, and the power output and quality of transmission is turned down. Generally, there are two manners to improve alignment. The first is an active alignment of lighting the laser diode and aligning through coupling. It can achieve precise alignment, however it costs much. The second is a passive alignment of applying an alignment key for assembly. It greatly saves assembly cost, however the process is difficult to be approached.

In a triplex optical transceiver, at the light emitter side, the laser beam from the laser diode has to pass through several splitters and filters before getting into a single-mode fiber. Because the laser beam transmitting in a free space diffuses in accordance with its transmission distance, it encounters a problem that the final laser beam coupled to the single-mode fiber is less. In order to solve the problem, micro lenses have to be used for increasing the numerical aperture. However, using micro lens increases the cost and the complication of assembly.

For a duplex optical transceiver, there are commonly planar waveguides or tubular waveguides available. A planar waveguide optical subassembly includes three major optical coupling interfaces: the laser diode with a planar waveguide, the planar waveguide with another planar waveguide via a filter, and the planar waveguide with a single-mode fiber. The three interfaces all encounter problems of optical misalignment. Different types of waveguide further have problems of field mismatch. Therefore, it is hard to improve the coupling efficiency of the whole unit. Tubular waveguide optical subassembly mainly uses lens to solve the problem of free space optical misalignment. The alignment tolerance is compensated by lens. However, the coupling efficiency is still low and the lens increases the cost.

Only tubular optical subassembly is used in a triplex optical transceiver. The tubular light emitter and tubular light receiver increase the cost of the optical components. Further, the tubular components have larger dimensions that increase the coupling length in free space and cause lower efficiency and light dispersion in the transmission.

As described above, whatever for a planar waveguide optical subassembly or a tubular optical subassembly, the cost of the assembly in the coupling interface is hard to be reduced.

SUMMARY OF THE INVENTION

The object of the invention is to provide a fiber waveguide optical subassembly to increase the alignment tolerance between the active optical element and the waveguide. The filter is thinner to lower the dispersion caused by the optical coupling gap. It reduces the cost and enhances the transmission rate.

In order to achieve the aforesaid object, the fiber waveguide optical subassembly of the invention includes an optical bench, a light emitter, a first optical transmission element, a splitter, a light detector and a second optical transmission element. The optical bench supports all the optical elements. The first optical transmission element has relative front end and rear end. The front end couples with the light emitter. The rear end links to one end of the splitter. Another end of the splitter connects with the second optical transmission element. The light detector locates on one side of the splitter.

The light emitter outputs light signal through the first optical transmission element, the splitter and the second optical transmission element. The input light signal passes through the second optical transmission element; reflected by the splitter and enters the light detector. The first optical transmission element increases the alignment tolerance between the light emitter and the waveguide. It prevents from additional alignment process, reduces the cost and enhances the transmission rate.

In particular, the first and the second optical transmission element maybe is a multi-mode optical fiber or a planar waveguide.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

The fiber waveguide optical subassembly according to the invention is applicable to light transceivers and mainly includes: an optical bench, a light emitter, a first optical transmission element, a splitter, a light detector and a second optical transmission element. The first optical transmission element maybe is a multi-mode optical fiber or a planar waveguide, and the second optical transmission element maybe is a single-mode optical fiber, a multi-mode optical fiber or a planar waveguide.

The following descriptions relate to general applications of duplexer and triplexer comprising the multi-mode optical fiber and the single-mode optical fiber.

Figure 1:
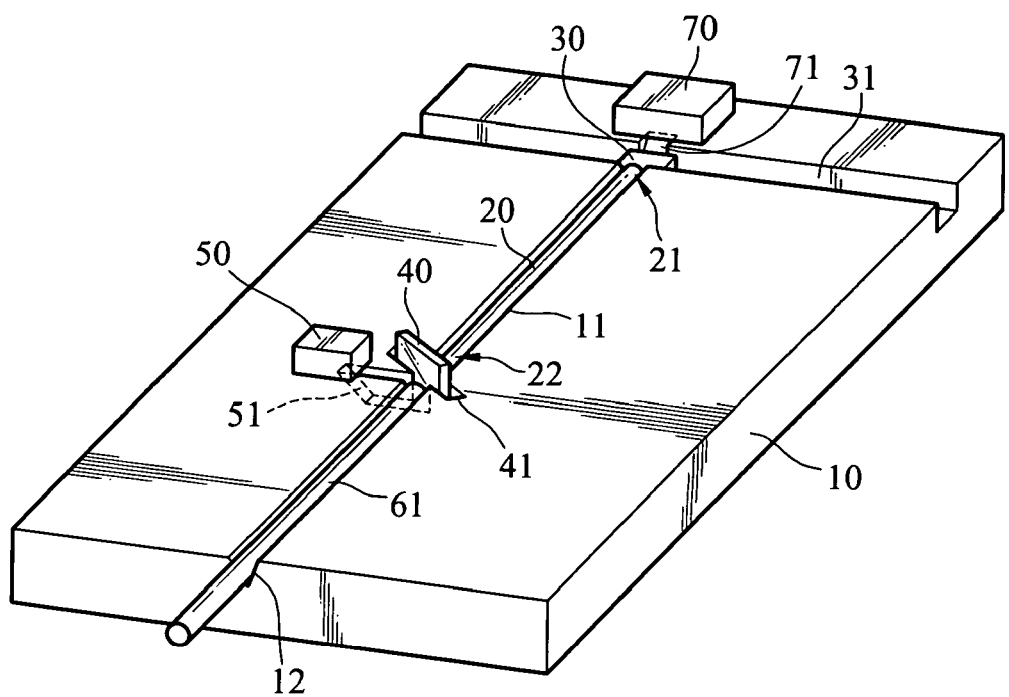
FIG. 1 is a first embodiment of duplexer optical subassembly of the invention.

As shown in FIG. 1, a duplexer optical subassembly of the invention includes an optical bench 10, a light emitter 30, a multi-mode optical fiber 20, a splitter 40, a light detector 50 and a single-mode optical fiber 61. The optical bench 10 includes two fiber grooves 11, 12 (such as V-shape grooves), an emitter groove 31 and a splitter groove 41 for supporting all the optical components. The multi-mode optical fiber 20 positioned in the fiber groove 11 has a front end 21 and a rear end 22. The light emitter 30 is positioned in the emitter groove 31. The front end 21 of the multi-mode optical fiber 20 couples with the light emitter 30. The splitter 40 located in the splitter groove 41 couples with the rear end 22 of the multi-mode optical fiber 20. The single-mode optical fiber 61 located in the fiber groove 12 couples with the splitter 40 and connects outward. The light detector 50 locates aside the splitter 40. There can be a ball lens (not shown) located between the light emitter 30 and the front end of the multi-mode optical fiber 20.

Figure 2A:
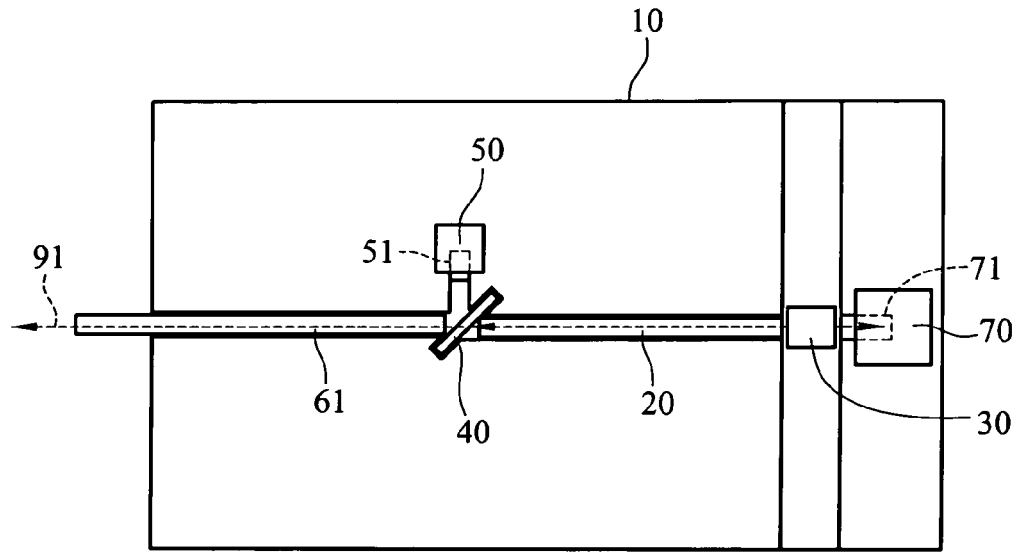
FIGS. 2A, 2B are descriptive views of optical path in the first embodiment of duplexer optical subassembly of the invention.
Figure 2B:
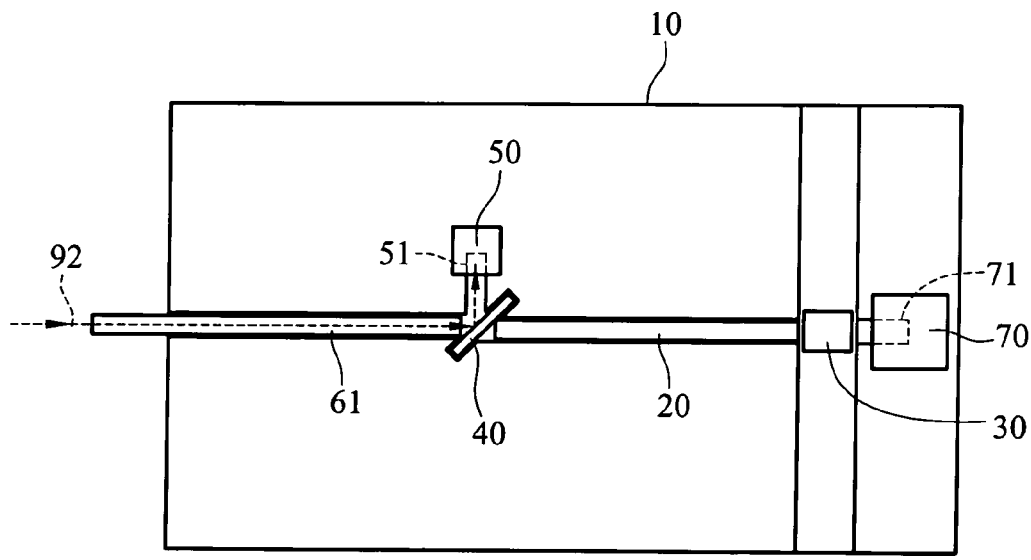

The optical bench 10 is made of semiconductor material, polymer or metal. The light emitter 30 is an edge-emitting laser diode or a surface-emitting laser diode. As shown in FIG. 2A, the light emitter 30 outputs light signal 91 through the multi-mode optical fiber 20, the splitter 40 and the single-mode optical fiber 61. The splitter 40 can be a film filter having thickness around 20 to 100 micrometers. As shown in FIG. 2B, when downloading light signals, the input light signal 92 enters the single-mode optical fiber 61, reflected by the splitter 40 and enters the light detector 50. The multi-mode optical fiber 20 provides an alignment tolerance around +/−10 micrometers. Therefore, a length among 0.2 to 10 millimeters is applicable. The single-mode optical fiber 61 can be replaced by a multi-mode or another kind of optical fiber for a shorter distance local network transmission.

As shown in FIG. 1, a monitor 70 is further installed behind the light emitter 30 for monitoring the emission of the emitter 30. The light emitter 30 mainly provides a forward light toward the multi-mode optical fiber 20, however, a little part of light emits backward. Therefore, a reflective surface 71 reflects the backward light to the monitor 70 for the monitoring function. As shown in FIG. 2B, the light detector 50 is also mounted upon a reflective surface 51 for receiving the input light signal 92 reflected by the reflective surface 51.

Figure 3A:
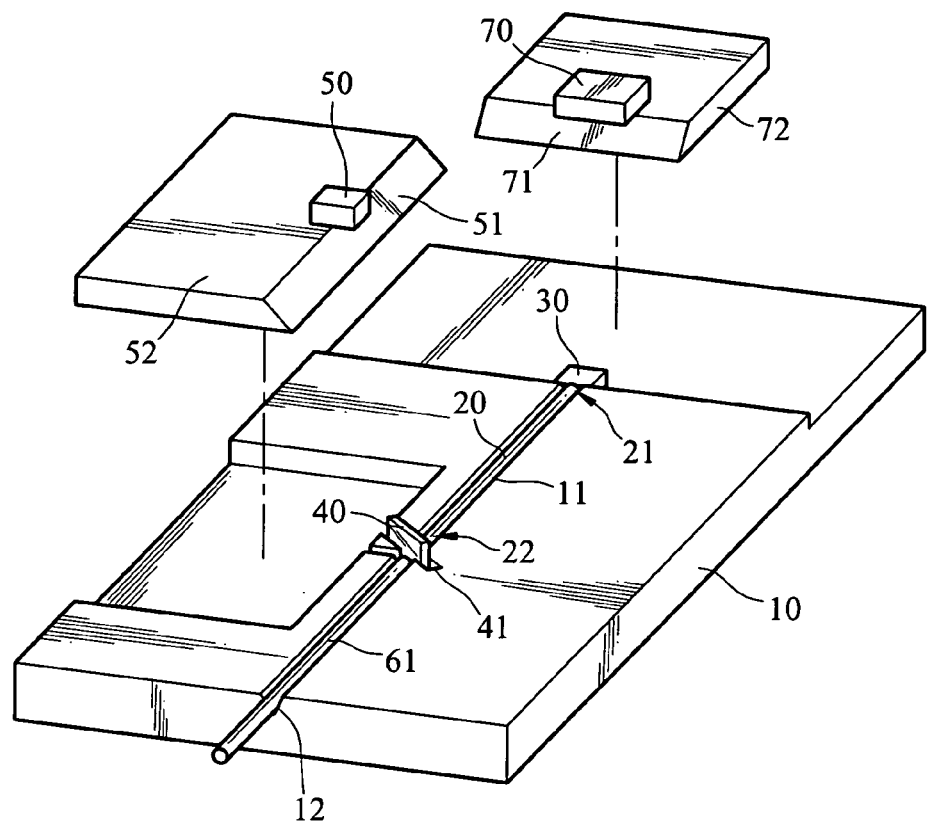
FIGS. 3A and 3B are perspective views of a second embodiment of duplexer optical subassembly of the invention.
Figure 3B:
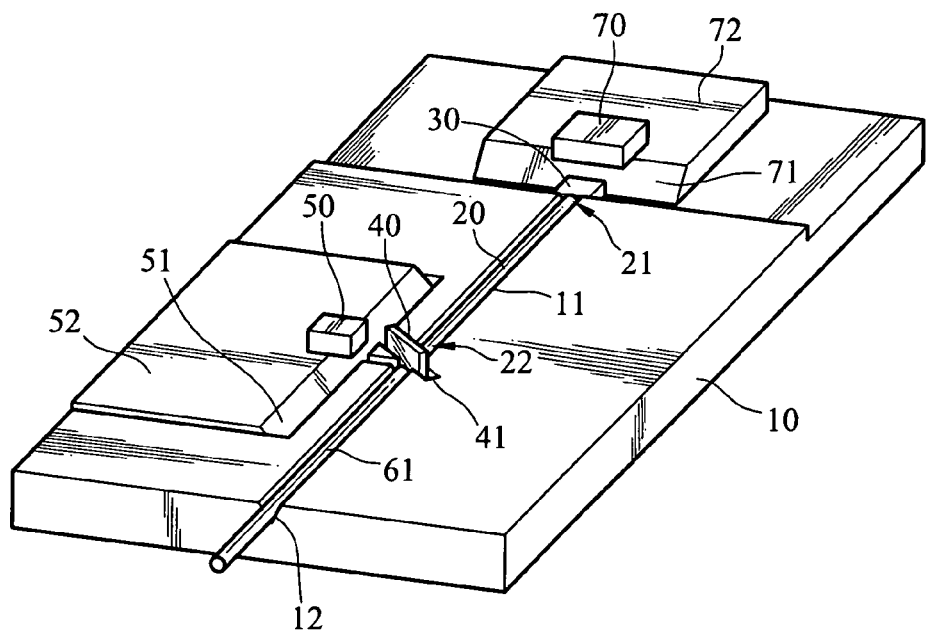

To prevent from difficulties of fabricating the reflective surfaces 51, 71 on the optical bench 10, a second embodiment is provided as shown in FIG. 3A and FIG. 3B. A monitor carrier 72 formed with a reflective surface 71 carries the monitor 70. The same, a detector carrier 52 formed with a reflective surface 51 carries the light detector 50. Therefore, the optical bench 10 is not needed for being machined with the reflective surfaces 51, 71; but only to be mounted with the monitor carrier 72 and the detector carrier 52.

Figure 4:
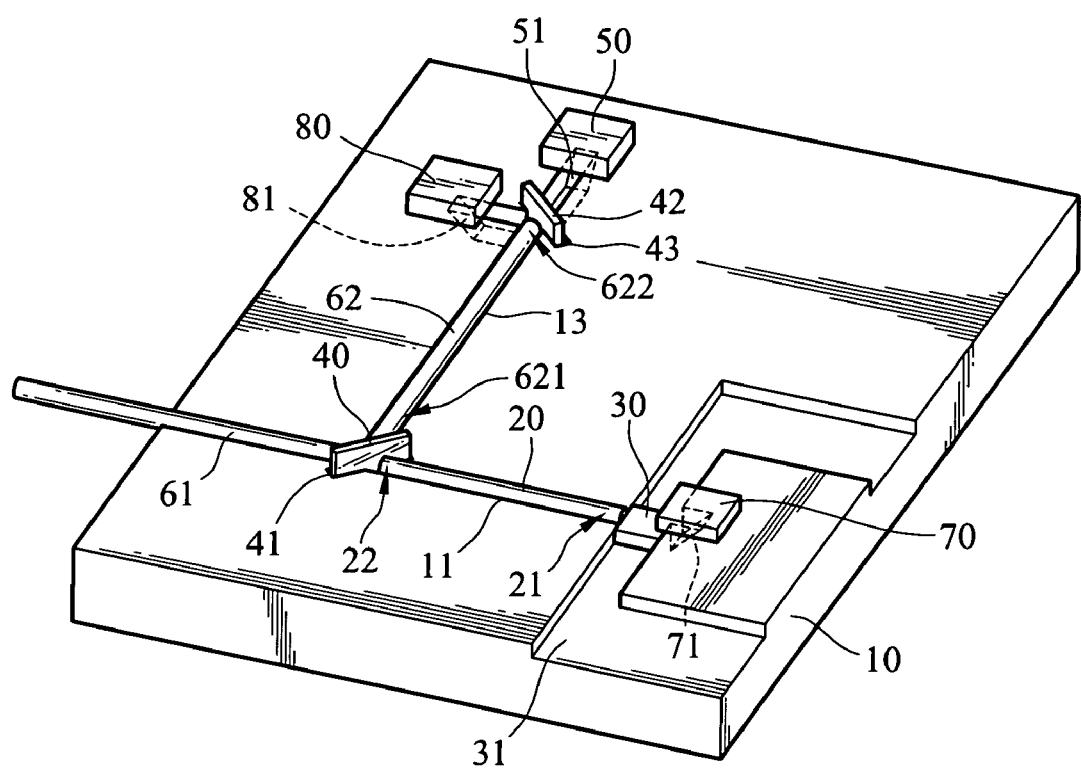
FIG. 4 is a first embodiment of triplexer optical subassembly of the invention.

On the other hand, the invention may further comprise a third optical transmission element. The third optical transmission element is a multi-mode optical fiber described below, of course the third optical transmission element may is a planar waveguide. The first embodiment of triplexer optical subassembly of the invention is shown in FIG. 4. It has a similar construction to the duplexer optical subassembly described above, but further having a second multi-mode optical fiber 62 located in a fiber groove 13; and a third splitter 42 located in a third splitter groove 43. The second multi-mode optical fiber 62 has a front end 621 coupled with the splitter 40; and a rear end 622 coupled with the third splitter 42. In the drawing, besides the fiber groove 13 and the third splitter groove 43, other optical components, such as the emitter groove 31, the splitter groove 41, the light detector 50, a third light detector 80 and monitor 70, are applied in the same way.

Figure 5A:
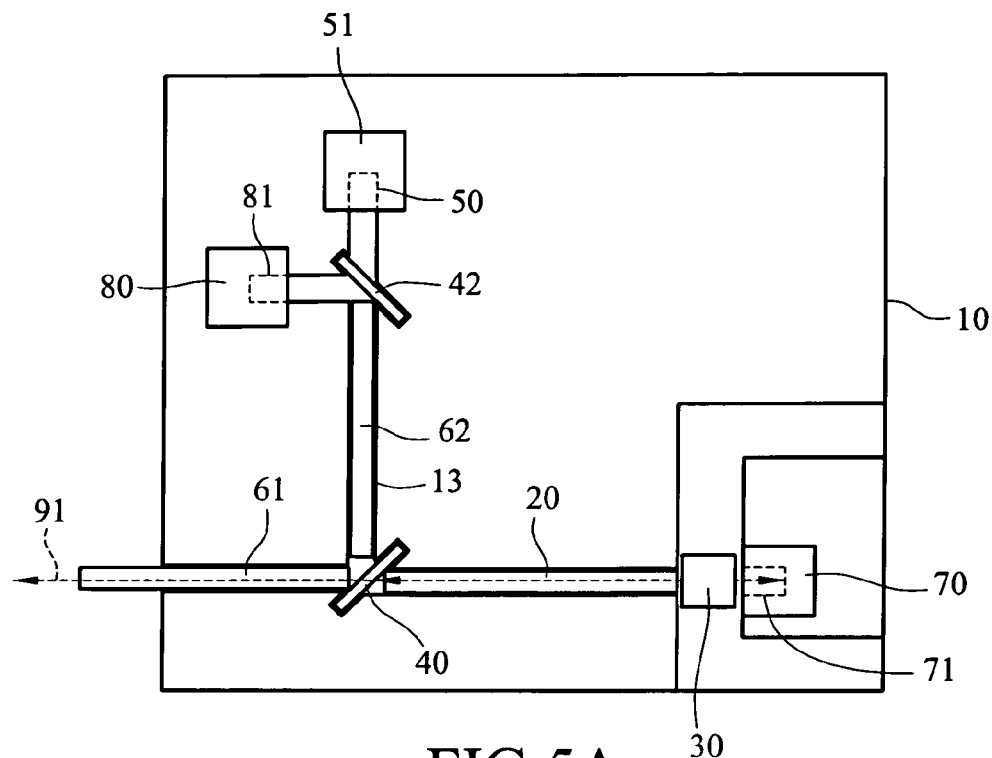
FIGS. 5A, 5B are descriptive views of optical path in the first embodiment of triplexer optical subassembly of the invention.
Figure 5B:
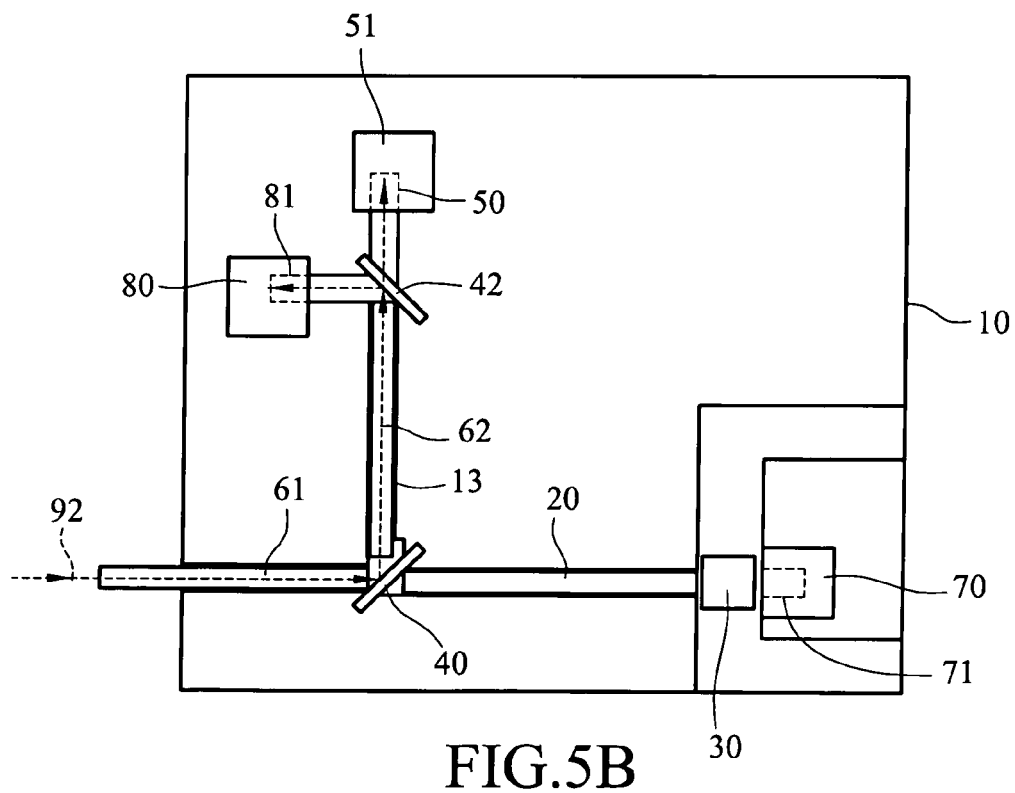

As shown in FIG. 5A, the output light signal 91 passes through the splitter 40 and the single-mode optical fiber 61. As shown in FIG. 5B, when downloading light signals, the input light signal 92 enters the single-mode optical fiber 61, reflected by the splitter 40 and enters the second multi-mode optical fiber 62. A part of the input light signal 92 passes the third splitter 42 and a part of it reflects in accordance with the wavelength of the input light signal 92. Therefore, the input light signal 92 is separated to the light detector 50 and the third light detector 80.

Figure 6A:
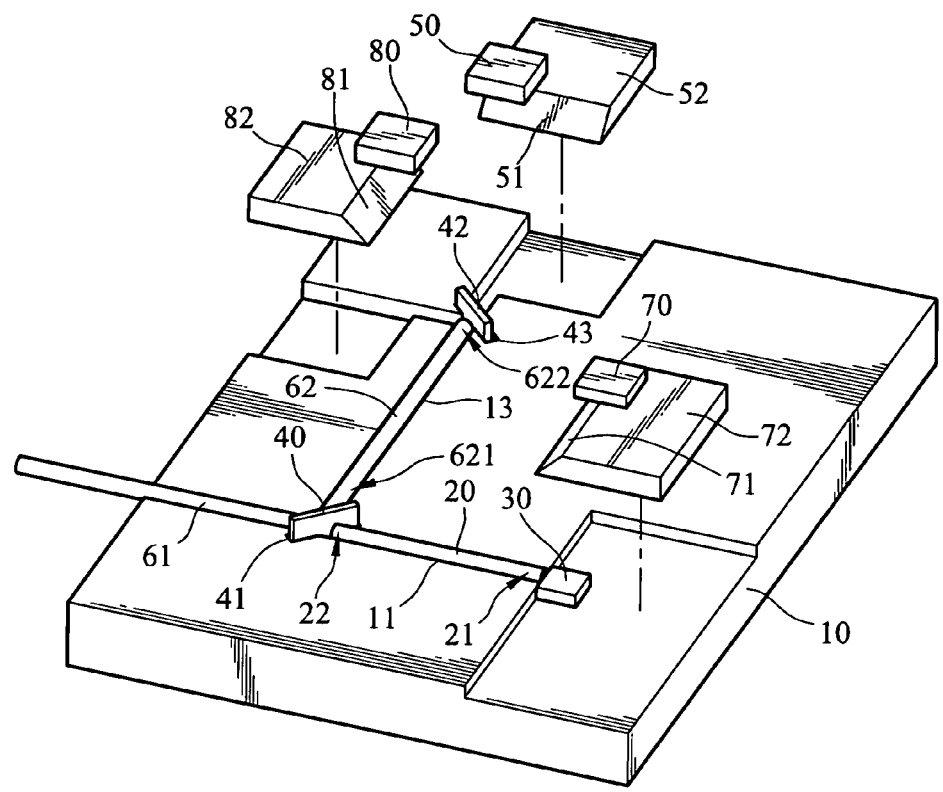
FIGS. 6A and 6B are perspective views of a second embodiment of triplexer optical subassembly of the invention.
Figure 6B:
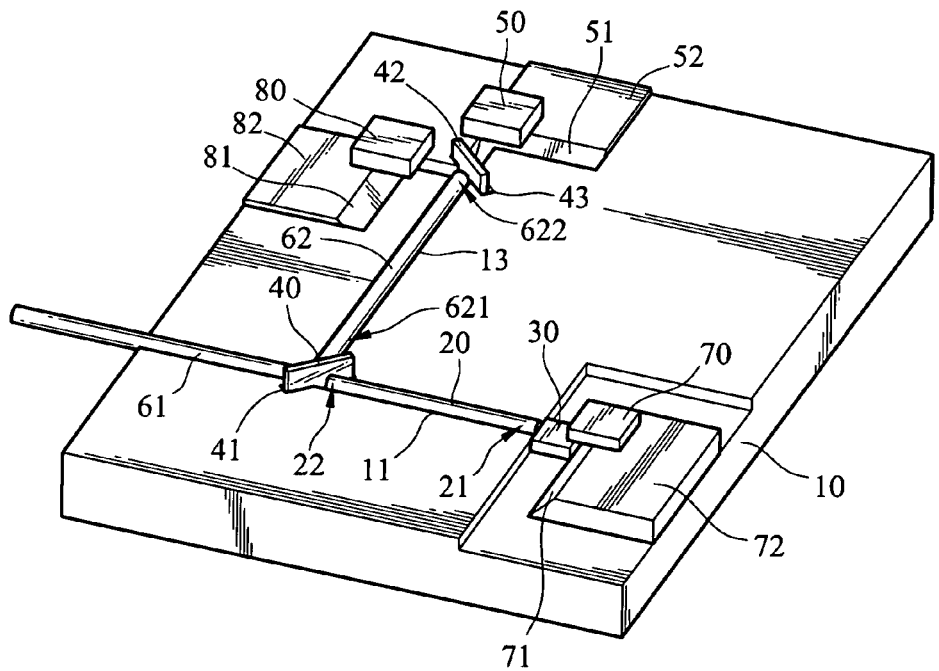

The same, there is a reflective surface 81 under the third light detector 80. In order to prevent difficult machining, in a second embodiment of triplexer optical subassembly of the invention as shown in FIGS. 6A and 6B, a second detector carrier 82 formed with a reflective surface 81 carries the third light detector 80. The rest construction is the same as that of duplexer optical subassembly described above and will not be further described herein.

By suitably applying multi-mode optical fiber, the optical subassembly of the invention has the following advantages:

1) Larger tolerance in optical alignment to achieve passive positioning;

2) Thinner optical coupling spacial gap to lower the dispersion;

3) Higher coupling efficiency to increase optical output of the subassembly; and 4) Inexpensive optical fiber to lower the manufacturing cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fiber waveguide optical subassembly, comprising:

a light emitter, for emitting an output light signal;

a first optical transmission element having a front end and a relative rear end, and a ball lens located between said light emitter and said front end of said first optical transmission element, said front end coupling with said light emitter for receiving and transmitting said output light signal;

a splitter, located on said rear end of said first optical transmission element for said output light signal passing through;

a second optical transmission element, located on one side of said splitter, for passing said output light signal and receiving an input optical signal;

a light detector, located aside said splitter for receiving said input optical signal transmitted through said second optical transmission element and reflected by said splitter;

a monitor, adjacent to said light emitter; and an optical bench for carrying said light emitter, said first optical transmission element, said splitter; said second optical transmission element said light detector and said monitor, said optical bench comprising an emitter carrier for carrying and fixing said light emitter onto said optical bench, said emitter carrier further comprising a reflective surface for reflecting said output light signal to said monitor;

wherein said optical bench has bench grooves positioning said first optical transmission element and said second optical transmission element, a splitter groove positioning said splitter and an emitter groove positioning said light emitter, said bench grooves and said splitter groove and said emitter groove being integrally formed at a same surface of said optical bench.

2. The fiber waveguide optical subassembly of claim 1, wherein said light emitter is chosen from a group consisting of an edge-emitting laser diode and a surface-emitting laser diode.

3. The fiber waveguide optical subassembly of claim 1, wherein said first optical transmission element is a multi-mode optical fiber.

4. The fiber waveguide optical subassembly of claim 3, wherein said multi-mode optical fiber has a length in the range of 0.2 to 10 millimeters.

5. A fiber waveguide optical subassembly, comprising:
a light emitter, for emitting an output light signal;
a first optical transmission element having a front end and a relative rear end, said front end coupling with said light emitter for receiving and transmitting said output light signal, wherein said first optical transmission element is a planar waveguide;
a splitter, located on said rear end of said first optical transmission element for said output light signal passing through;
a second optical transmission element, located on one side of said splitter, for passing said output light signal and receiving an input optical signal;
a light detector, located aside said splitter for receiving said input optical signal transmitted through said second optical transmission element and reflected by said splitter;
a monitor, adjacent to said light emitter; and
an optical bench for carrying said light emitter, said first optical transmission element, said splitter, said second optical transmission element and said light detector, said optical bench comprising an emitter carrier for carrying and fixing said light emitter onto said optical bench, said emitter carrier further comprising a reflective surface for reflecting said output light signal to said monitor;
wherein said optical bench has bench grooves positioning said first optical transmission element and said second optical transmission element, a splitter groove positioning said splitter and an emitter groove positioning said light emitter, said bench grooves and said splitter groove and said emitter groove being integrally formed at a same surface of said optical bench.

6. A fiber waveguide optical subassembly, comprising:
a light emitter, for emitting an output light signal;
a first optical transmission element having a front end and a relative rear end, said front end coupling with said light emitter for receiving and transmitting said output light signal;
a splitter, located on said rear end of said first optical transmission element for said output light signal passing through, wherein said splitter is a film filter;
a second optical transmission element, located on one side of said splitter, for passing said output light signal and receiving an input optical signal;
a light detector, located aside said splitter for receiving said input optical signal transmitted through said second optical transmission element and reflected by said splitter;
an optical bench for carrying said light emitter, said first optical transmission element, said splitter, said second optical transmission element and said light detector, said optical bench comprising an emitter carrier for carrying and fixing said light emitter onto said optical bench, said emitter carrier further comprising a reflective surface for reflecting said output light signal to said light detector; and
wherein said optical bench has bench grooves positioning said first optical transmission element and said second optical transmission element, a splitter groove positioning said splitter and an emitter groove positioning said light emitter, said bench grooves and said splitter groove and said emitter groove being integrally formed at a same surface of said optical bench.

7. The fiber waveguide optical subassembly of claim 6, wherein said film filter has a thickness in the range of 20 to 100 micrometers.

8. The fiber waveguide optical subassembly of claim 1, wherein said second optical transmission element is a multi-mode optical fiber.

9. The fiber waveguide optical subassembly of claim 1, wherein said second optical transmission element is a single-mode optical fiber.

10. A fiber waveguide optical subassembly, comprising:
a light emitter, for emitting an output light signal;
a first optical transmission element having a front end and a relative rear end, said front end coupling with said light emitter for receiving and transmitting said output light signal;
a splitter, located on said rear end of said first optical transmission element for said output light signal passing through;
a second optical transmission element, located on one side of said splitter, for passing said output light signal and receiving an input optical signal, wherein said second optical transmission element is a planar waveguide;
a light detector, located aside said splitter for receiving said input optical signal transmitted through said second optical transmission element and reflected by said splitter;
a monitor. adjacent to said light emitter; and
an optical bench for carrying said light emitter, said first optical transmission element, said splitter, said second optical transmission element and said light detector, said optical bench comprising an emitter carrier for carrying and fixing said light emitter onto said optical bench, said emitter carrier further comprising a reflective surface for reflecting said output light signal to said monitor;
wherein said optical bench has bench grooves positioning said first optical transmission element and said second optical transmission element, a splitter groove positioning said splitter and an emitter groove positioning said light emitter, said bench grooves and said splitter groove and said emitter groove being integrally formed at a same surface of said optical bench.

11. The fiber waveguide optical subassembly of claim 1, wherein said optical bench is made of material chosen from a group consisting of a semiconductor material, a polymer and a metal.

12. The fiber waveguide optical subassembly of claim 1, wherein said bench grooves are of V-shape.

13. The fiber waveguide optical subassembly of claim 1, wherein said optical bench is formed with a detector groove for positioning said light detector.

14. The fiber waveguide optical subassembly of claim 1, further comprising a detector carrier for carrying and fixing said light detector to said optical bench, said detector carrier further comprising a reflective surface for reflecting said input light signal to said light detector.

15. A fiber waveguide optical subassembly, comprising:
a light emitter, for emitting an output light signal;
a first optical transmission element having a front end and a relative rear end, said front end coupling with said light emitter for receiving and transmitting said output light signal;
a splitter, located on said rear end of said first optical transmission element for said output light signal passing through;
a second optical transmission element, located on one side of said splitter, for passing said output light signal and receiving an input optical signal;
a light detector, located aside said splitter for receiving said input optical signal transmitted through said second optical transmission element and reflected by said splitter;
an optical bench for carrying said light emitter, said first optical transmission element, said splitter, said second optical transmission element and said light detector;
a detector carrier for carrying and fixing said light detector onto said optical bench, said detector carrier comprising a reflective surface for reflecting said input light signal to said light detector; and
a third optical transmission element, a second light detector and a second splitter mounted on said optical bench, wherein said third optical transmission element comprises a front end and a rear end, said front end couples with one side of said splitter for receiving said input light signal, said second splitter is mounted at said rear end of said third optical transmission element, said light detector and said second light detector located on both sides of said second splitter so that said input light signal is selectively reflected and passes through said second splitter and enters said light detector and said second light detector; and
wherein said optical bench has bench grooves positioning said first optical transmission element and said second optical transmission element, a splitter groove positioning said splitter and an emitter groove positioning said light emitter, said bench grooves and said splitter groove and said emitter groove being integrally formed at a same surface of said optical bench.

16. The fiber waveguide optical subassembly of claim 15, wherein said third optical transmission element is a multi-mode optical fiber.

17. The fiber waveguide optical subassembly of claim 16, wherein said multi-mode optical fiber has a length in the range of 0.2 to 10 millimeters.

18. The fiber waveguide optical subassembly of claim 15, wherein said third optical transmission element is a planar waveguide.

19. The fiber waveguide optical subassembly of claim 15, wherein said second splitter is a film filter.

20. The fiber waveguide optical subassembly of claim 19, wherein said film filter has a thickness in the range of 20 to 100 micrometers.

21. The fiber waveguide optical subassembly of claim 15, further comprising a second detector carrier for carrying and fixing said second light detector onto said optical bench, said second detector carrier further comprising a reflective surface for reflecting said input light signal to said second light detector.

22. The fiber waveguide optical subassembly of claim 6, wherein said first optical transmission element is a multi-mode optical fiber.

23. The fiber waveguide optical subassembly of claim 22, wherein said multi-mode optical fiber has a length in the range of 0.2 to 10 millimeters.

24. The fiber waveguide optical subassembly of claim 6, wherein said film filter has a thickness in the range of 20 to 100 micrometers.

25. The fiber waveguide optical subassembly of claim 6, further comprises a ball lens located between said light emitter and said front end of said first optical transmission element.

26. The fiber waveguide optical subassembly of claim 6, wherein said second optical transmission element is a multi-mode optical fiber.

27. The fiber waveguide optical subassembly of claim 6, wherein said second optical transmission element is a single-mode optical fiber.

28. The fiber waveguide optical subassembly of claim 6, wherein said second optical transmission element is a planar waveguide.

29. The fiber waveguide optical subassembly of claim 6, further comprising a third optical transmission element, a second light detector and a second splitter mounted on said optical bench, said third optical transmission element comprising a front end and a rear end, said front end coupling with one side of said splitter for receiving said input light signal, said second splitter mounted at said rear end of said third optical transmission element, said light detector and said second light detector located on opposite sides of said second splitter so that said input light signal is selectively reflected and passes through said second splitter and enters said light detector and said second light detector.

* * * * *